Figure 1:
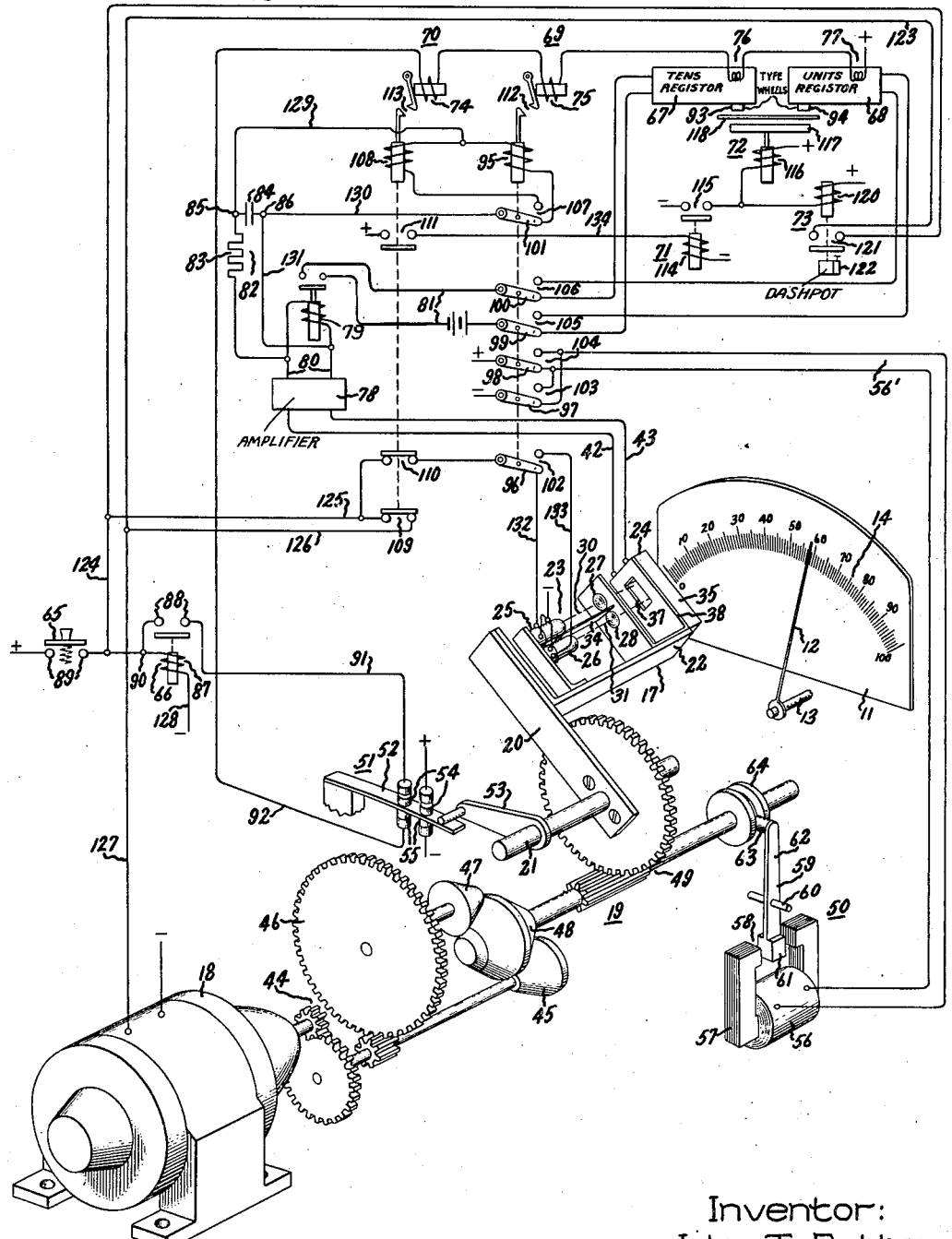

Jan. 15, 1946.  J. T. POTTER  2,393,186
INSTRUMENT-READING REGISTER AND PRINTER
Filed Nov. 12, 1942  2 Sheets—Sheet 1

Inventor:
John T. Potter,
by Harry E. Dunham
His Attorney.

Jan. 15, 1946. J. T. POTTER 2,393,186
INSTRUMENT-READING REGISTER AND PRINTER
Filed Nov. 12, 1942 2 Sheets-Sheet 2
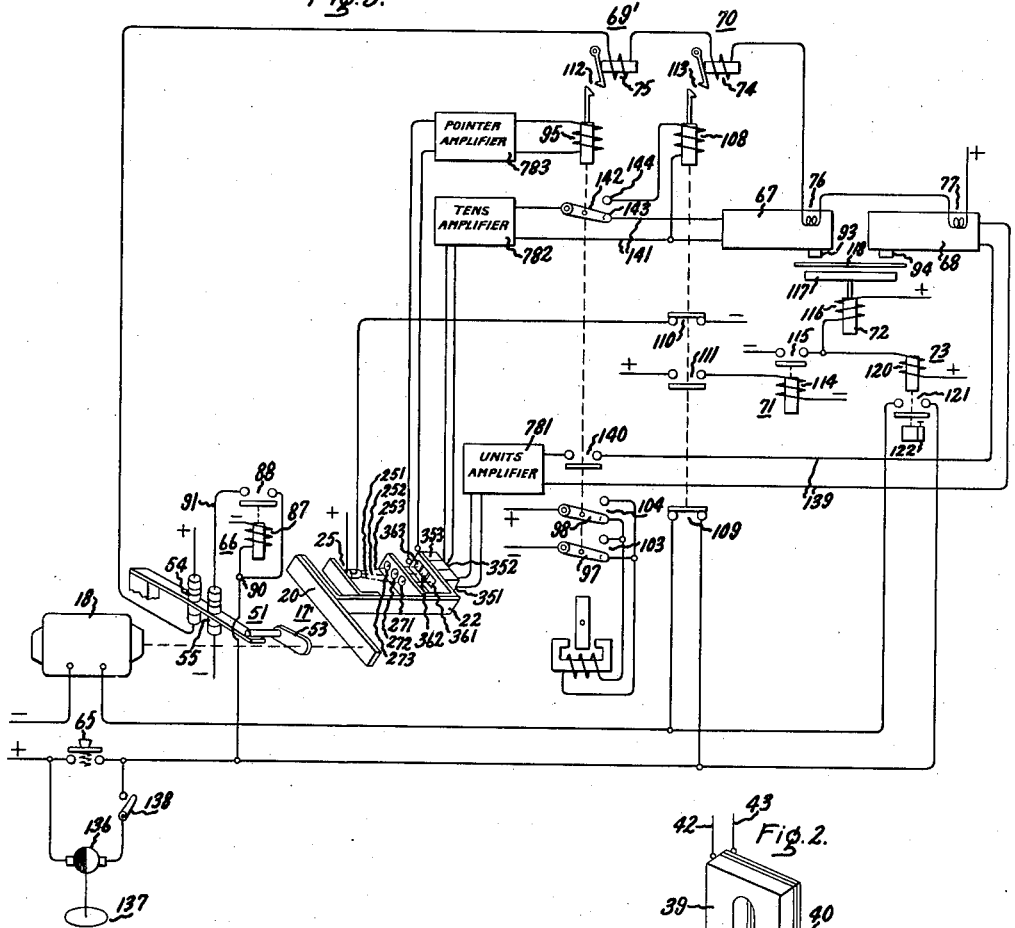
Inventor:
John T. Potter,
by Harry E. Dunham
His Attorney.

Patented Jan. 15, 1946

2,393,186

UNITED STATES PATENT OFFICE 2,393,186

INSTRUMENT-READING REGISTER AND PRINTER

John T. Potter, Port Washington, N. Y., assignor to General Electric Company, a corporation of New York Application November 12, 1942, Serial No. 465,399

6 Claims. (Cl. 177—351)

My invention relates to photoelectric devices and registers.

It is an object of my invention to provide an improved, rapid and accurate method and apparatus for registering or printing instrument readings or pointer deflections whenever desired or at regular intervals without imposing any load upon the moving system of the instrument and without introducing any weight or friction.

Other and further objects and advantages will become apparent as the description proceeds.

In carrying out my invention in its preferred form I provide a lamp head mounted on a movable arm and adapted to be placed in front of the scale of an instrument so that it may be moved along the instrument scale. The lamp head includes light beam projecting means for projecting one or more beams of light against the instrument scale and light responsive means exposed to light reflected from the instrument scale. Impulse responsive registers are connected directly or indirectly through amplifiers to the light responsive means so that light impulses produced as the light beam crosses the scale divisions are converted into electrical impulses which operate the registers. Separate registers may be provided for counting the tens and units divisions. A motor operated reversible drive is provided for moving the arm and a control system is provided which is selectively responsive to the light impulses produced when projected light crosses the pointer for causing the arm carrying the lamp head to reverse its motion when the light beam reaches the pointer position and for transferring connections from the tens register to the units register. The control system is arranged also for later causing interruption of the operation when the projected light has been carried back to the last preceding tens division. In this manner the combined registrations of the tens register and the units register represent the instrument reading. The tens register counts the number of tens division crossed by the light beam as the arm moves in one direction and the units register counts the number of units divisions between the position of the pointer and the last preceding tens division as the arm moves in the reverse direction.

A better understanding of the invention will be afforded by the following detailed description considered in connection with the accompanying drawings, and those features of the invention which are believed to be novel and patentable will be pointed out in the claims appended hereto.

In the drawings Fig. 1 is a circuit diagram of one embodiment of my invention with a portion of the apparatus shown in distorted perspective, that is, with one dimension magnified so as to separate the parts of the mechanism for clarity in the drawing; Fig. 2 is a perspective view of an electrical light responsive device which may be employed as an element of the apparatus of Fig. 1; Fig. 3 is a circuit diagram of a modification of the system illustrated in Fig. 1, and Fig. 4 is a diagram showing a part of an instrument scale with the optical paths of light beams represented in two different positions of the movable lamp head for explaining the principle of operation of the apparatus of Fig. 1. Like reference characters are used throughout the drawings to designate like parts.

Measuring instruments of various kinds including electrical measuring instruments such as ammeters, voltmeters, and the like, and mechanical instruments such as pressure gauges, position indicators and the like ordinarily have a scale plate carrying an arcuate scale with a pointer carried by an instrument or the like for deflecting the pointer in front of the scale plate along the scale so that the position of the pointer with respect to the scale indicates a measurement or reading. The scale is divided into divisions by division lines which ordinarily are numbered, so that each division line represents a numerical reading. For precise measurements ordinarily unnumbered division lines are placed between the numbered division lines to represent smaller divisions or subdivisions. These larger and smaller subdivisions may be referred to as major and minor divisions. Frequently the minor divisions have $\frac{1}{10}$ or $\frac{1}{5}$ the value of the major divisions. With ordinary scale markings the major and minor divisions may be tens divisions and units divisions respectively.

In the drawings I have illustrated apparatus for photoelectrically reading the indication of such an instrument and registering the reading on the numbered wheels or cyclometer dials as well as printing the reading if desired on tape or cards. In this manner a reading represented by a pointer deflection is converted into a numerical value represented by digits visible in a register or printed on a register tape for future reference. It will be apparent that my invention is not limited to a reading of decimal scales, or scales in which the minor divisions have $\frac{1}{10}$ the value of the major divisions, but for the sake of illustration, I shall describe apparatus used with such a scale and having registering devices with tens and units elements.

My invention has been illustrated in Fig. 1 in connection with an instrument represented by a scale plate 11 and a pointer 12 carried by a rotatable shaft 13, driven by an instrument movement (not shown). For the sake of illustration the scale plate 11 is shown with an arcuate scale rather than a linear scale since the former is much more frequently used, although it will be understood that my invention is not limited to the use of an arcuate scale and a rotatable pointer as distinguished from a straight line scale and a pointer or index moving in a straight line. The scale 14 is divided into major and minor divisions by major division lines identified by the numerical values zero, 10, etc. up to 100, and minor division lines placed between the major division lines. It will be observed that the major division lines, in this case tens division lines, are longer than the minor division lines and therefore project radially into a portion of the scale plate or into an arcuate path 15 which is free from minor markings or any optical obstructions except for the pointer 12. The pointer 12 in turn extends radially beyond the arcuate band 15 as well as extending into the area 16 within the arcuate scale.

For electrically reading and registering the measurement represented by the position of the pointer 12, a device is provided which projects light beams against the scale plate 11 and produces electrical impulses as the light beams cross the scale division lines. One set of impulses is produced as light beams projected into the area 15 cross tens division lines with the light beam projecting mechanism moving up scale. Another set of impulses is produced as the light beams cross the units division line with the light projecting mechanism moving down scale from the position of the pointer 12 to the position of the next preceding tens division.

The instrument reading apparatus comprises a scale traversing mechanism and a control and registration circuit. When the specific arrangement illustrated in Fig. 1 is employed the instrument to be read is one of the type in which the tens divisions are not only longer but also heavier or wider than the units divisions. As illustrated more clearly in Fig. 4 the pointer 12 in turn is heavier or wider than the tens divisions. The reason for this will become apparent when the apparatus of Fig. 1 has been described.

The scale traversing mechanism comprises a lamp head 17, a motor 18, and a mechanical driving system collectively represented by the reference numeral 19 interposed between the motor 18 and the lamp head 17.

The lamp head 17 has an arm 20 carried by a rotatable shaft 21. The lamp head 17 itself comprises a bracket 22 secured to the arm 20, light beam projecting means 23 carried by the bracket 22, and light responsive means 24 also carried by the bracket 22. The scale traversing mechanism need not be a part of the instrument to be read and may be applied to any deflecting pointer instrument. Preferably the scale traversing mechanism is placed in front of the scale plate 11 of the instrument with the arm-carrying shaft 21 approximately in line with the instrument shaft 13, and with the lamp head 17 approximately the same radial distance from its shaft 21 as the arcuate scale 14 of the instrument is from the instrument shaft 13. If desired the bracket 22 may be adjustably mounted on the arm 20, or the arm 20 may be adjustable in length for the purpose of adapting the apparatus for instruments of different sizes having different radii of arc of the scale.

The light beam projecting means 23 illustrated in Fig. 1 comprises a pair of lamps such as incandescent lamps 25 and 26 which will for convenience be designated the tens lamp and the units lamp respectively and a focusing or lens system, in this case consisting of a pair of lenses 27 and 28 for focusing beams of light from the lamps 25 and 26 respectively upon the portions of the instrument scale forming arcuate paths designated in Fig. 4 by the reference numerals 15 and 29 respectively. The arcuate path 15 is that into which the tens divisions project but into which the units divisions do not project, and the arcuate path 29 is the portion of the scale occupied by the units divisions. For the position of the apparatus illustrated in Fig. 1 the optical paths of the light beams produced by the lamps 25 and 26 are represented by the heavy dash line 30 and the light dash line 31 respectively shown in Fig. 4. For another angular position of the lamp head 17 and the arm 20 the optical paths of the light beams produced by these respective lamps are represented in Fig. 4 by the light dash line 32 and the heavy dash line 33. The reason for representing the optical paths by different weights of lines will be explained hereinafter.

In order to guard against confusion between the light beams produced by the lamps 25 and 26, a light separator or shield 34 may if desired be placed between the lamps 25 and 26 in the space between them and the lenses 27 and 28. Although for convenience I have shown an arrangement using separate lenses it will be understood that my invention is not limited to the specific arrangement shown and does not exclude the use of different optical arrangements. Light from two different lamps spaced apart may be projected through the same lens so as to come to foci at different points on the scale plate 11. Ordinarily it would be desirable to guard against interference with the light beams from the lamps 25 and 26 by stray light sources and accordingly a light-tight enclosure or hood (not shown) may be placed around the lamp head 17.

The light responsive means 35 illustrated in Fig. 1 may consist of a single cell or unit which has the capability for converting light into electric voltage or current and which accordingly has the capability for converting a change in light to which it is exposed, that is, an increase or decrease in light into an electrical impulse. The light responsive unit may be a photovoltaic cell of the blocking layer type described in Patent No. 2,209,815, Goss and McCune.

Such a photoelectric cell is shown in greater detail in Fig. 2. The actual construction differs from that illustrated in the aforesaid Goss et al. patent and from those customarily employed in illuminometers and exposure meters in that an opening 36 is made completely through the cell 35. A corresponding opening 37 is provided in the mounting post 38 secured to the bracket 22 for attaching the block 35 to the bracket 22. As shown in Fig. 2 photoelectric cells of the blocking layer type comprise a relatively heavy backing or plate 39 composed of a suitable material such as steel, the front surface of which carries a layer 40 of light sensitive material such as selenium which is in turn covered by one or more layers of conducting material such as cadmium or platinum and the like. For the sake of simplicity only one such top conducting layer 41 is illustrated in Fig. 2. Electrical connections to the cell 35 are made by means of leads 42 and 43 connected respectively to the steel backing 39 and the topmost conducting film 41.

The driving system for moving the arm 20 and the lamp head 17 along the arcuate scale 14 comprises the motor 18, a speed reduction gear 44, a direct or high speed forward clutch cone 45 directly driven by the reduction gearing 44, speed reducing and reversing gearing 46, a reverse speed clutch cone 47 driven through the speed reduction and reversing gearing 46, a double-cone driven clutch element 48, and further speed reduction gearing 49 driving the lamp-head-carrying shaft 21. Although my invention is not limited to the use of a reversing clutch instead of a reversible motor or to having a different speed in the forward direction than in the reverse direction, I consider it advantageous to have a reduced driving speed in the reverse direction for reasons which will be explained hereinafter. The driven clutch element 48 is axially movable so that it may be brought into contact with either the forward driving element 45 or the reverse driving element 47. For accomplishing this movement a clutch controller 50 is provided.

A reverse limit switch 51 is provided having a switch blade 52 mechanically operated by a limit switch crank 53 secured to the lamp-head-carrying shaft 21. The switch blade 52 carries a pair of limit control contacts 54 and a pair of reset contacts 55, the electrical connections of which will be explained hereinafter.

The clutch controller 50 may be of any desired type. For the sake of illustration it is shown as comprising an electrical operating coil 56 having a laminated soft iron yoke 57 with a gap 58 therein, and a centrally pivoted polarized armature 59 having a pivoted axis 60, a pole 61 of one polarity in the gap 58 of the yoke 57 and a pole 62 of the opposite polarity on the opposite side of the pivoted axis 60. An extension of the armature 59 serves as an operating arm to carry a pin 63 cooperating with a grooved collar 64 for controlling the axial position of the driven clutch element 48. For the sake of illustration the apparatus is described as energized by a direct current system and employing the polarized type of clutch controller 50 responsive to the polarity of the current supplied to the operating winding 56, although my invention is not limited to this arrangement.

The control and registration system includes elements connected to a pair of input or energizing terminals represented in the drawings by the plus and minus symbols. For convenience the connections of different elements to the positive terminal of the energizing source are represented by different plus symbols and likewise a plurality of minus symbols are shown representing connections to the negative terminal. In this manner confusion in the drawings is avoided. It will be understood, however, that it is not necessary to have more than one source of energizing current and that if desired all the points in the drawings marked plus may be electrically connected to the positive terminal and all the points in the drawings marked minus may be connected to the negative terminal of the energizing source. The control and registration system comprises, in addition to the positive and negative energizing terminals, a starting button 65, a motor circuit-holding or sealing-in relay 66, registers for counting and registering the major and minor divisions of the scale 14 consisting in this case of a tens register 67 and a units register 68, a multi-contact motor-reversing relay 69, a motor-stopping relay 70, a printer relay 71, a printer 72, a motor restarting relay 73, which is a time delay relay, resetting coils 74, 75, 76 and 77 for the motor stopping relay 70, the motor reversing relay 69, the tens register 67, and the units register 68, respectively, and suitable amplifiers for making the control circuit responsive to the electrical impulses produced by the photoelectric cell 35.

In the arrangement illustrated there may be an amplifier 78 with input terminals to the output leads 42 and 43 of photoelectric cell 35. I may also provide a sensitive relay circuit 79 with input terminals connected by conductors 80 to output terminals of the amplifier 78 and with output terminals connected by conductors 18 through transfer contacts, to be described hereinafter, alternatively to the registers 67 and 68. For reasons to be explained hereinafter I may also provide what may be called a desensitizing circuit 82 between the amplifier output leads 80 and the connections to operating windings of the relays 69 and 70 to be described hereinafter. For making the relays 69 and 70 responsive only to impulses which are both relatively strong and of longer duration than those caused by a light beam crossing a minor scale division, the desensitizing circuit 82 may consist of a resistor 83 and a condenser 84 in series between the amplifier output terminals 80, the output terminals of the circuit 82 comprising the condenser terminals 85 and 86. Short, relatively weak impulses from the amplifier 78 are absorbed by the condenser 84 and sensitive relay 79 and do not operate the relays 69 and 70, while long, stronger impulses more than completely charge the condenser and are not fully absorbed so that there is a sufficient excess energy to operate the relays.

The holding relay 66 comprises a coil 87 for operating an armature to close a pair of contacts 88 when the coil 87 is energized. The starting button 65 comprises a disk or the like for momentarily connecting a pair of contacts 89 interposed between the positive terminal of the energizing current source and the positive terminal 90 of the holding relay winding 87, the winding 87 being connected between one of the starting button terminals 89 and the negative terminal of the current source. The limit switch 51 has its limit or motor-circuit holding contacts 54 connected between the positive terminal of the current source and the holding relay contacts 88 through a conductor 91. The resetting contacts 55 of the limit switch 51 are connected between the negative terminal of the current source and a conductor 92 which is connected in series with the resetting coils 74, 75, 76 and 77 to the positive terminal of the current source.

The registers 67 and 68 are represented only schematically, but it will be understood that they include suitable well-known internal electrical mechanism for producing progressive step wise rotation of digit-carrrying registers or type wheels 93 and 94, respectively, in response to electrical impulses. The type wheel 94 of the units register 68, for the normal decimal system assumed, carries digits from zero to 9 inclusive, the normal position of the type wheel being that with the digit zero exposed. The type wheel 93 of the tens register 67 likewise carries numerals from zero to 9 or higher if desired. However, for reasons which will be explained hereinafter, in the specific apparatus of Fig. 1, the normal position of the type wheel 93 is such that the receipt of the second impulse will move it to the zero position. The registers 67 and 68 are also so constructed with internal mechanism (not shown) that the type wheels may be restored to the normal or original position when the reset coils 76 and 77 are energized. Such mechanism may be of a common type where a spiral spring is wound when a printing wheel is advanced and the advance retained by a ratchet and pawl, and the pawl lifted from the ratchet wheel when the coil, such as 76, is energized to allow the printing wheel to return to initial position.

The motor reversing relay 69 comprises an operating winding 95 for moving a plunger carrying a plurality of movable contacts 96, 97, 98, 99, 100 and 101 cooperating respectively with pairs of stationary contacts 102 for transferring connections between lamps 25 and 26, 103 and 104 for reversing connections to the clutch controller winding 56, 105 and 106 for transferring connections from the sensitive relay output leads 81 between the tens register 67 and the units register 68, and a pair of contacts 107 for transferring the connection of the desensitizing circuit output terminal 86 from the reversing relay energizing winding 95 to an energizing winding 108 of the motor stopping relay 70.

The motor stopping relay 70 comprises, in addition to the operating winding 108 and the armature controlled thereby, a plurality of movable contacts cooperating with stationary contacts as follows: normally closed motor stopping contacts 109, normally closed light-extinguishing contacts 110, and normally open printer operating contacts 111. Each of the relays 69 and 70 is provided with latching mechanism consisting of pairs of cooperating hooks 112 and 113 respectively, which latch to hold the armatures of the relays in the upper position after the operating coils have been energized and which release to permit the relay contacts to return to their normal position when the resetting coils 74 and 75 are energized.

The printer relay 71 comprises an operating winding 114 and a pair of normally open contacts 115. The printer 72 comprises an operating winding 116 for raising a platen 117 against the type wheels 93 and 94 of the registers 67 and 68, respectively. It will be understood that a chart or tape 118 is placed between the platen 117 and the type wheels 93 and 94 in order that the registered value may be printed thereon when the printer 72 is energized. If the register receiving medium 118 is a tape, it will be understood that suitable conventional means (not shown) may be provided for progressively advancing the tape at the uniform rate or for advancing it a suitable distance each time the winding 116 is energized. This may be accomplished by any suitable form of mechanism such as a ratchet wheel (not shown but well known to those skilled in the art). The printer operating winding 116 and the printer relay contacts 115 are connected in series between the positive and negative terminals of the current source.

The motor-restarting relay 73 comprises an operating winding 120 for controlling a pair of normally open contacts 121 and has a suitable mechanism such as a dashpot 122 for introducing time delay in the operation. The motor restarting relay 73 also has its operating winding 120 connected in series with the printer relay contacts 115 between the terminals of the energizing source. The motor restarting contacts 121 are connected across the motor-stopping contacts 109 of the motor-stopping relay 70, and these in turn are connected between the positive terminal 90 of the holding coil 87 and one of the terminals of the motor 18, the other terminal of which is connected to the negative terminal of the energizing source.

It will be observed that the movable reversing contact blades 97 and 98 of the motor reversing relay 69 are connected to the terminals of the energizing source. Since a polarized clutch controller 50 has been shown, it will be understood that the current source must be a direct current source, although the other elements of the apparatus may be connected to a separate alternating current source instead if preferred.

The lamps 25 and 26 have a common terminal connected to one terminal of the current source represented as a negative terminal for the sake of identification and the other terminals of the lamps are connected to the contacts 102 of the motor reversing relay 69. The cooperating movable contact 96 is connected in series with the light extinguishing contacts 110 of the motor-stopping relay 70 to the positive terminal 90 of the motor circuit holding relay 66.

The operation accomplished by the apparatus of Fig. 1 is illustrated in Fig. 4. Initially with the apparatus in the position in Fig. 1 and before the starting button 65 has been pressed both lamps 25 and 26 are deenergized and no light beam is produced. However, as soon as the button 65 is depressed, the tens lamp 25 becomes illuminated and produces a light beam represented by the optical path 30 shown by a heavy dash line in Fig. 4. The optical path 31 of the light beam which would be produced by the other lamp 26, if it were energized, is represented by the line 31 consisting of light dashes. As the motor runs it moves the arm 20 and lamp head 17 up scale causing optical paths 30 and 31 of the lamps to move up scale striking the scale plate in the areas 15 and 29 respectively. The only light beam, however, is that along the optical path 30 of the tens lamp 25 as the other lamp 26 is dark. As the light beam 30 crosses the zero division which is obviously one of the tens divisions, the reflected light falling on the light cell 35 is momentarily decreased (assuming the scale has black markings on a white background) and an electrical impulse is transferred through the amplifier 78 and the sensitive relay 79 to the tens counter 67. This moves the tens type wheel 93 to the zero position. Then, when the tens light beam crosses the next tens division represented at 10, another impulse is produced and so on.

Assuming that the pointer lies between the division 10 and the division 20 (which is not shown in Fig. 4) another impulse will be produced when the light beam from the tens lamp 25 reaches the pointer 12. However, since the pointer 12 in the case of the apparatus of Fig. 1 is wider than the tens divisions and the light falling on the light cell 35 is decreased a longer period of time than before, a longer and stronger electrical impulse is conveyed by the amplifier 78 to the circuit 82. The current supplied to the operating winding 95 of the motor reversing relay 69 becomes strong enough to operate the relay which then lifts its movable contacts and latches into the upper position. When this happens the motor drive reverses and the lamp head 17 starts to move down the scale. Furthermore, the lamp 25 is extinguished and the lamp 26 becomes illuminated which is represented in Fig. 4 by the fact that the optical path from the lamp 25 is shown by the light dash line 32 and the optical path of the light beam from the lamp 26, which is now illuminated is represented by the heavy dash line 33. The connections have also been transferred from the tens register 67 to the units register 68. Consequently the impulses produced as the beam 33 crosses the units divisions are counted and registered by the units register 68. However, when the beam 33 on the return movement strikes the tens division, in this case the division 10, owing to the fact that this division line is wider than the units division line a stronger and longer electrical impulse is produced which becomes sufficient to energize the motor stopping relay coil 108, which was previously connected in the circuit by the operation of the relay 69. Such tens division also serves as a unit division of the unit scale and operates the unit register accordingly. The type wheel 94 is preferably arranged to be moved to the zero position on the first impulse received by it so that the final unit count will be correct. The lifting of the motor-stopping contacts 109 and the light-extinguishing contacts 110 by the motor stopping relay 70 causes an interruption in the operation of the apparatus, and the registers 67 and 68 give a combined registration representing the number of tens divisions from zero to the pointer 12 and the number of units divisions between the pointer 12 and the preceding tens division (in the case of Fig. 4 the division 10). The closing of the printer operating contacts 111 by the relay 70 causes the registration to be printed on the chart or tape 118.

The sequence of operation of the apparatus and further details thereof are tabulated in the following table:

SEQUENCE TABLE FOR FIG. 1

*Push button 65 is closed momentarily*

1. Motor 18 starts.
2. Holding relay 66 is energized.
3. Reverse limit switch contacts 54 close.
4. Holding relay contacts 88 seal in the relay to keep the motor running.
5. The push button 65 may be released.
6. The sensitive relay 79 transmits impulses to the tens counter 67.

*Lamp head 17 reaches the pointer 12*

A strong impulse operates the motor-reversing relay 69, which

1. Reverses the clutch drive (1/10 speed now) at contacts 97, 98, 103.
2. Transfers current from the tens lamp 25 to the units lamp 26 at contacts 96, 102.
3. Transfers the sensitive relay 79 to the units counter 68 at contacts 99, 100, 105, 106.
   (a) Sensitive relay 79 transmits impulses to the units counter 68.
4. Latches itself up at 112.
5. Transfers the energizing circuit from its own winding 95 to the motor-stopping relay winding 108 at contacts 101, 107.

*Lamp head 17 reaches the tens division (coming back toward zero)*

A strong impulse operates the motor-stopping relay 70 which

1. Stops the motor 18 at contacts 109.
2. Opens the lamp circuit at the contacts 110.
3. Latches itself up at 113.
4. Operates the printer relay 71 (at contact 111) which
   (a) Energizes the printer 72 through contacts 115.
   (b) Energizes the time delay motor restarting relay 73 through contacts 115.

*Time delay relay 73 picks up*

The motor starts again with the clutch drive still in reverse.

1. Lamp head 17 moves to a position below zero and strikes the reverse limit switch 51, which
2. Opens the motor holding contacts 54 which
   (a) Stops the motor.
3. Energizes the resetting coils 74, 75, 76 and 77 to restore all relays and the counter wheels to their initial position.

Thus the instrument reading may be registered and printed by depressing the starting button 65 and after registration of the reading the apparatus restores itself to its original condition in readiness for registering another reading. If it is desired to integrate or totalize successive readings, the resetting coils 76 and 77 of the registers 67 and 68 may of course be omitted or disconnected.

As indicated in the foregoing table and shown in the drawing, Fig. 1, operation of the starting button 65 closes an electrical circuit from the positive terminal of the current source through the starting button contacts 89, a length of conductor 124, a conductor 125, normally closed motor stopping contacts 109, a conductor 126, a conductor 127 through the motor 18 to the negative current source terminal thus energizing the motor. Simultaneously a circuit is closed from the positive terminal through the starting button contacts 89 to the terminal 90 of the motor holding relay 87 through its operating winding 87 and the conductor 128 to the negative terminal. This causes the holding relay contacts 88 to close. As soon as the motor 18 has rotated far enough to lift the limit switch 23 and allow the limit contacts 54 to close another circuit independent of the starting button 65 is formed from the positive terminal of the current source through the limit switch contacts 54, the conductor 91, the holding relay contacts 88, the conductors 124, 125, the motor-stopping contacts 109, the conductors 126 and 127 through the motor 18 to the negative terminal to keep the motor 18 running. So long as the limit swtich contacts 54 and the holding relay contacts 88 are closed the terminal 90 of the holding relay serves as a positive source terminal and current is supplied to various other elements of the apparatus. For example, a circuit is formed from the positive terminal 90 through the conductors 124, 125, the normally closed lamp extinguishing contacts 110, movable contact 96, a conductor 132 through the tens lamp 25 to the negative terminal of the current source.

When the lamp head 17 is carried to the position of the pointer 12 after all of the intervening tens division lines of the scale have been registered by the register 67, the motor restraining relay 69 is energized. This leaves the movable contact 96 and transfers the circuit from this contact through a conductor 133 and the units lamp 26 to the negative terminal of the current source. Simultaneously the lifting of the contacts 97 and 98 reverses the connections through the conductors 56' to the clutch controller winding 56 and reverses the direction of the motor drive.

When the light beam produced by the lamp 25 strikes the pointer 12 the longer and stronger light impulse reflected by the light responsive cell 35 is converted to an electrical impulse, is amplified by the amplifier 78 and supplied through the conductors 80, the resistor 83, the conductor 129 to the motor reversing relay winding 95 in a return circuit through the lower transfer contact 107, the movable contact 101, and conductors 130 and 131 to the remaining output lead 80 of the amplifier 78.

The operation of the motor reversing relay 69 also lifts the movable contact 101 bringing it into electrical contact with the upper one of the pair of stationary contacts 107. This completes a circuit from the output leads 80 of the amplifier 78 through the motor-stopping relay winding 108 instead of through the motor-reversing relay winding 95. Thus, the motor-stopping relay 70 is in readiness to be operated the next time a long strong impulse is produced. It is to be observed that after the motor is started the reset contacts 55 of the limit switch 51 open so as to deenergize the reset coils 74 and 75 and allow the latches 112 and 113 to hold the armatures of the relays 69 and 70 up as each relay becomes energized. Thus, all of the movable contacts of the relay 69 including the relay transfer contact 101 remain in the upper position.

The next longer and stronger impulse occurs when the light beam on the down-scale or reverse travel recrosses the last preceding tens division line, which is wider than the units division line. Thereupon the energization of the motor-stopping relay winding 108 lifts its contacts and causes it to latch in the upward position. The opening thereby of the motor-stopping contacts 109 interrupts the running of the motor 18. The lifting of the light-extinguishing contacts 110 interrupts the circuit to the lamp 26 and prevents any further impulses being supplied to the registers. The closing of the normally open printer-operating contacts 111 completes a circuit from the positive terminal of the current source through the contacts 111, a conductor 134, the printer relay operating winding 114 to the negative terminal of the current source. This in turn closes the contacts 115 and completes branch circuits from the positive terminal of the current source through the printer operating coil 116, and the time delay motor restarting relay winding 120, through the printer relay contacts 115 to the negative terminal of the current source. The printer platen 117 rises immediately and prints the registration on the chart or tape 118.

After a time delay, the motor restarting contacts 121 close and the interrupted operation of the motor 18 is resumed, the circuit this time taking place from the holding relay terminal 90 through the conductor 124, the conductors 123 shorted by the motor restarting contacts 121 back to the motor lead 127 and the motor 18 to the negative current source terminal. When the lamp head 17 has been carried back to its original position to the left beyond the zero division line of the scale 114, the limit switch crank 53 opens the limit contacts 54 and closes the resetting contacts 55. This breaks the holding circuit through the holding relay winding 87, which thereupon trips out. It also closes a circuit from the positive terminal of the current source through the resetting coils 77, 76, 75 and 74 through the conductor 92 and the reset contacts 55 to the negative terminal of the current source. Thereupon the counter wheels are restored to their original positions in readiness for another instrument reading and the relays 69 and 70 are tripped out to restore the original connections.

Although I have described the operation of an arrangement in which an instrument reading is registered and printed whenever desired, it will be understood that my invention is not limited thereto, and that the arrangement may be such as to print registrations of the instrument readings at predetermined intervals. For this purposed the starting button 65 may be shunted by an intermittently closing circuit. For example, as illustrated in Fig. 3 the starting button contacts 89 may be shunted by an intermittent switch or an interrupter 136 of the rotating type driven by a constant speed motor 137. A switch 138 may be interposed in the connections to permit disconnection of the intermittent switch 136 when desired in order to cause operation of the apparatus to be initiated only manually by means of the starting button 65.

In connection with Figs. 1 and 4 I have described an arrangement in which the reversal of the lamp head carrying drive and the operation of the printing mechanism is brought about by impulses differing in character from those produced by the scale division lines for operating the registers 67 and 68. My invention is not, however, limited to this specific arrangement. For example, if desired impulses produced from different light beams projected to different parts of the scale may be transmitted through different circuits so that a difference in the character of impulses is unnecessary. Thus, in the arrangement of Fig. 3 it would not be necessary for the tens division lines to be any heavier than the units division lines, nor would it be necessary for the pointer 12 to have any greater width than the scale division lines.

In the arrangement of Fig. 3 a lamp head 17' similar to the lamp head 17 is employed but in this case there are three separate light responsive cells 351, 352 and 353 mounted one above the other on an upright secured to the bracket 22. The light cells 351, 352 and 353, although somewhat smaller, may be of the same type as illustrated in Figs. 1 and 2, also having openings 361, 362 and 363 respectively. Three lamps may if desired be employed to cooperate with the three light cells, but this is unnecessary and if desired a single lamp 25 may be employed. Three beams of light 251, 252 and 253 from the lamp 25 may be passed through lenses 271, 272 and 273 through the light cell openings 351, 352 and 353 respectively and focused by the lenses on the scale plate 11. The light beam 251 will correspond to that following the path 31 in Fig. 4, and the light beam 252 will correspond to that following the light path 30 in Fig. 4. The units light beam 251 is projected upon the portion 29 of the scale 14, occupied by the units divisions, and the tens light beam 252 is projected upon the portion 15, occupied by the tens divisions but not by the units divisions. The third light beam 253, however, is projected to a portion of the scale plate which is not occupied by any part of the scale but which is crossed by the pointer 12 as it deflects. It is assumed that the pointer 12 projects radially outward beyond the division lines of the scale and the light beam 253 is shown as beyond the light beams 251 and 252. However, if desired, the light beam 253, intended to cooperate only with the pointer 12, may be arranged so as to fall radially inward from the scale 14 on the scale plate.

Separate amplifiers 781, 782 and 783 are connected to the output leads of the light cells 351, 352 and 353 respectively, these being referred to respectively as the units amplifier, the tens amplifier and the pointer amplifier. The unit amplifier is connected by conductors 139 to the units register 68 but with normally open contacts 140 interposed in the connection. The contacts 140 are carried by the plunger of a motor-reversing relay 69', which corresponds to the motor reversing relay 69 of Fig. 1, but has a slightly modified contact arrangement. The tens amplifier 782 is connected to the tens register 67 through conductors 141 and a pair of impulse transfer contacts consisting of a normally-down movable contact 142 and a stationary contact 143. The movable contact 142 is also carried by the plunger of the motor reversing relay 69'. The pointer amplifier 783 has its output connected directly to the operating winding 95 of the motor reversing relay 69'. A second stationary contact 144 in the upward position of the movable contact 142 is provided for forming a circuit from the output of the tens amplifier 782 through the motor stopping relay operating winding 108 when the motor reversing relay is in its upward position.

In other respects the arrangement of Fig. 3 may be substantially that of Fig. 1. It is not necessary for the reversing drive for moving the lamp-head 17' to have a slow speed on the reverse, but it may be advantageous if it is desired to operate the apparatus at the maximum impulse frequency at which the amplifiers and the registers will operate efficiently. When the reverse speed is one-tenth of the forward speed and the number of minor divisions of the scale 14 is ten times the number of major divisions, it will be evident that the impulse frequencies for operating the registers 67 and 68 are made uniform by making the forward and reverse speeds of the lamp head 17 in the ratio suggested.

The manner of operation of the apparatus of Fig. 3 will be readily perceived by its analogy to the arrangement of Fig. 1. The operating details and the sequence of operation are summarized in the following table:

SEQUENCE TABLE FOR FIG. 3

*Push button 65 is closed momentarily*

1. Motor 18 starts.
2. Holding relay 66 is energized.
3. Reverse limit switch contacts 54 close.
4. Holding relay contacts 88 seal in the relay to keep the motor running.
5. Push button 65 may be released.
6. Cell 352 and amplifier 782 transmit impulses to the tens counter 67.

*Lamp head 17' reaches the pointer 12*

Cell 353 and pointer amplifier 783 operate the motor-reversing relay 69', which

1. Reverses the clutch drive (1/10 speed now) through contacts 97 and 98.
2. Closes the circuit from the units amplifier 781 to the units counter 68 through contacts 140.
    (a) Units division lines are counted.
3. Latches itself up at 112 in the manner of an ordinary latch where the latch pawl is biased by gravity to latching position and is removed from such position by an electromagnet when the coil 75 is energized.
4. Transfers the tens amplifier 782 from the tens register 67 to the motor stopping relay coil 108, which is thereby placed in readiness to respond to an impulse produced by passing a tens division.

*Lamp head 17' reaches the tens division (coming back toward zero)*

Motor stopping relay 70 is actuated which

1. Stops the motor by opening contacts 109.
2. Opens the lamp circuit at contacts 110.
3. Latches itself up.
4. Operates the printer relay 71 (through contacts 111) which
    (a) Energizes the printer 72.
    (b) Energizes the time-delay relay 73.

*Time delay relay 73 picks-up*

The motor 18 starts again with the clutch still in reverse.

1. Lamp head arm 17' moves to a position below zero and strikes the reverse limit switch 51 which
2. Opens the motor circuit holding contacts 54, which
    (a) Stops the motor 18.
3. Energizes the resetting coils to restore all relays and the counter wheels to their initial position.

It will be observed that as the lamp head 17' travels up scale the units register 68 is disconnected by the normally open contacts 140. Although the light beam 251 crosses the units divisions no units are counted on the upward travel. The tens amplifier 782 and the tens register 67, however, function in the same manner as described in connection with Fig. 1. The difference in operation occurs when the third light beam 253 strikes the position of the pointer 12. At that instant an impulse is transferred from the third light cell 353 through the pointer amplifier 783 to the operating winding 95 of the motor-reversing relay 69. This reverses the direction of the motor drive in the same manner as in the case of Fig. 1 and also transfers the connection from the tens amplifier to the operating winding 108 of the motor-stopping relay, likewise closing the connection at 140 from the units amplifier 781 to the units register 68. Then as the lamp head 17' travels down scale the units divisions crossed by the light beam 271 are counted. As soon as the preceding tens division is recrossed by the light beam 252 an impulse transmitted from the light cell 352 through the tens amplifier 782 energizes the motor stopping relay 70. This relay performs the same operations and has the same function as described in connection with Fig. 1. The resetting coils and the limit switch likewise function in the same manner.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. An instrument-indication printing system comprising in combination an instrument and reading apparatus, the instrument having a deflecting pointer and cooperating therewith a scale having major and minor division lines, the pointer being wider than the major division lines, and the major division lines being wider than the minor division lines, the reading apparatus comprising a moving arm so mounted as to traverse the instrument scale, means carried by the moving arm for projecting light onto the instrument scale, light responsive means also carried by the moving arm, mounted so as to be subject to the influence of light reflected from the instrument scale, a motor for driving the said moving arm, a motor starting circuit, a major divisions register with connections to said light responsive means for counting the major divisions passed by the light as the moving arm is driven along the scale, a minor divisions register with connections to said light responsive means for counting the minor divisions passed, a motor reversing circuit, a device with connections to said light responsive means responsive only to relatively strong light impulses for energizing said motor reversing circuit when the light reaches the pointer, and a relay for stopping the motor with connections to said light responsive means responsive only to relatively strong impulses produced by the light passing a major division.

2. A reading apparatus for registering the indication of a deflecting-pointer instrument having a scale with major and minor division lines along which a pointer is deflected, the pointer being wider than the major division lines and the major division lines being wider than the minor division lines, said apparatus comprising an arm to be mounted in proximity to such an instrument scale for movement along the scale, light beam projecting means carried by the arm for projecting light onto the instrument scale, light-responsive means also mounted on the movable arm exposed to light reflected from the scale, a motor for driving said arm, a major divisions register with connections to the said light responsive means for counting major division lines crossed by the projected light, a minor divisions register with connections to said light responsive means for counting minor division lines crossed by the projected light, a device with connections to said light responsive means and operable in response to relatively strong light impulses produced by the crossing of the instrument pointer by the projected light, a motor reversing circuit controlled by said device and a printing relay controlled by said device for printing the registration of said major and minor division registers when the projected light recrosses a major division line of the scale.

3. Apparatus for registering an indication of a deflecting pointer instrument having a scale with major and minor division lines along which a pointer is deflected, said apparatus comprising a movable arm mounted in proximity to such an instrument scale for movement along the scale, light beam projecting means carried by the arm for projecting light on to the instrument scale, light responsive means also mounted on the movable arm exposed to light reflected from the scale, a driver for moving the arm along the scale, a major divisions register with connections to the said light responsive means for counting major division lines crossed by projected light, a minor divisions register with connections to said light responsive means for counting the minor divisions crossed by the projected light, a control device for causing operation of said driver and movement of the arm in a predetermined direction along the instrument scale, a second control device with connections to said light responsive means and operable in response to a light impulse produced by the crossing of the instrument pointer by the projected light, a driver reverser controlled by said second device, and a third control device with connections to said light responsive means and operable in response to light impulses produced by the recrossing of a major division line of the scale during the return movement of the arm to interrupt operation of the apparatus, and switching means operated with said first and second control devices for switching said connections to the major division register and to the minor division register, respectively.

4. Apparatus for registering the indication of a deflecting pointer instrument having a stationary scale with minor divisions between major division lines thereon and a pointer adapted to deflect along said divisions in accordance with a measurement to be indicated, said apparatus comprising an arm mounted in proximity to said stationary instrument scale so as to be movable therealong, the graduation marks on the scale having different light-reflecting qualities than the scale space between the graduations, light beam projecting means carried by said arm for projecting light on the instrument scale, light responsive means exposed to light reflected from said scale and responsive to the variations in such reflected light produced by the scale graduations as the light responsive means is moved over the same, a motor for driving said arm, a register with connections to said light responsive means for counting the divisions crossed by the projected light and a control device with connections to said light responsive means and operable in response to a light impulse produced by the crossing of the instrument pointer by the projected light for interrupting operation of the apparatus and driving motor.

5. Apparatus for registering the indication of a deflecting pointer instrument having a scale with major and minor division lines and a pointer which deflects along the scale, said major division lines being wider than the minor division lines, and said pointer being wider than said minor division lines, said apparatus comprising a movable arm to be mounted in front of such an instrument scale so as to be movable along the scale, light beam projecting means mounted on said arm for projecting light onto the instrument scale, light responsive means also mounted on said arm exposed to light reflected from such an instrument scale, a reversible drive motor connected to said arm, terminals for connection to a source of energizing current, a starting circuit between said terminals and said motor, a holding circuit between said terminals and said motor, a major divisions register connected to said light responsive means for counting major scale divisions crossed by the projected light, a minor divisions register for counting minor divisions crossed by the projected light, a transfer relay connected to said light responsive device responsive only to relatively strong impulses such as produced by crossing of the instrument pointer by the projected light, a motor drive reverser controlled by said relay, transfer contact in said transfer relay for transferring the connections of said light responsive device from said major divisions counter to said minor divisions counter whereby minor divisions instead of major divisions are counted as the light beam-projecting means travels in the reverse direction along the scale, a motor-stopping relay with contacts in the circuit between said motor and said energizing terminals, said motor stopping relay being connected to said light responsive device and being responsive only to relatively strong impulses such as produced by crossing of a major division by the projected light, and a reverse limit switch with contacts in the said motor holding circuit, and mechanical connections to said arm for operating the reverse limit switch when the arm has been carried back to its original position.

6. Apparatus for registering the indication of a deflecting pointer instrument having a scale with major and minor division lines and a pointer, the major division lines projecting beyond the minor division lines, and the pointer projecting beyond both, and being deflectable along the scale in accordance with an indication measured by the instrument, said apparatus comprising a movable arm to be mounted in front on an instrument scale so as to be movable along the scale, light beam projecting means mounted on said arm for projecting three separate light beams against first, second and third portions of the scale, the first occupied by the minor divisions, the second by the major divisions but not the minor divisions, and the third by the pointer but none of the scale divisions, three light responsive devices also carried by said movable arm respectively exposed to light reflected from the portions of said scale illuminated by said respective light beams, a major divisions register with connections to the second of said light responsive devices, a minor divisions register with connections to the first of said light responsive devices, a motor drive, which is reversible, connected to said movable arm, a reversing relay controlling the direction of said motor drive and having connections to the third of said light responsive devices, a stopping relay interrupting operation of the apparatus, said reversing relay having normally open contacts in the connections to the minor divisions register, and having transfer contacts for disconnecting the second of said light responsive devices from the major divisions register and connecting it to the stopping relay when the reversing relay is energized, whereby said major divisions register counts the major divisions crossed by the second of said light beams as the motor drives the movable arm in a predetermined direction, the motor drive is reversed when the third light beam crosses the pointer, the minor divisions register counts the minor divisions as the movable arm travels in a reverse direction, and the operation is stopped when the arm is carried back to the preceding major division, so that the total registration represents the sum of the major divisions and the number of minor divisions between the last major division and the pointer position.

JOHN T. POTTER.